United States Patent [19]

Papadopoulos et al.

[11] Patent Number: 5,241,635

[45] Date of Patent: Aug. 31, 1993

[54] TAGGED TOKEN DATA PROCESSING SYSTEM WITH OPERAND MATCHING IN ACTIVATION FRAMES

[75] Inventors: Gregory M. Papadopoulos, Arlington; David E. Culler, Boston; Arvind, Arlington, all of Mass.

[73] Assignee: Massachusetts Institute of Technology, Cambridge, Mass.

[21] Appl. No.: 396,480

[22] Filed: Aug. 21, 1989

Related U.S. Application Data

[63] Continuation-in-part of Ser. No. 274,498, Nov. 18, 1988, abandoned.

[51] Int. Cl.$^5$ .............................................. G06F 9/38
[52] U.S. Cl. .......................... 395/375; 364/DIG. 1; 364/231.8; 364/262.4; 364/262.9; 364/263; 364/263.1; 364/241.8; 364/232.22
[58] Field of Search ............... 395/375, 800, 775, 200, 395/650

[56] References Cited

U.S. PATENT DOCUMENTS

| | | | |
|---|---|---|---|
| 3,962,706 | 6/1976 | Dennis et al. | 340/172.5 |
| 4,128,882 | 12/1978 | Dennis | 364/200 |
| 4,130,885 | 12/1978 | Dennis | 364/900 |
| 4,145,733 | 3/1979 | Misunas et al. | 364/200 |
| 4,149,240 | 4/1979 | Misunas et al. | 364/200 |
| 4,153,932 | 5/1979 | Dennis et al. | 364/200 |
| 4,229,790 | 10/1980 | Gilliland et al. | 364/200 |
| 4,811,214 | 3/1989 | Nosenchuck et al. | 395/800 |
| 4,837,676 | 6/1989 | Rosman | 395/325 |
| 4,860,191 | 8/1989 | Nomura et al. | 395/200 |
| 4,893,234 | 1/1990 | Davidson et al. | 395/800 |
| 4,916,652 | 4/1990 | Schwarz et al. | 395/375 |
| 4,922,413 | 5/1990 | Stoughton et al. | 364/200 |
| 4,943,916 | 7/1990 | Asano et al. | 395/775 |
| 4,953,082 | 8/1990 | Nomura et al. | 395/650 |
| 5,021,947 | 6/1991 | Campbell et al. | 364/200 |

*Primary Examiner*—Kevin A. Kriess
*Attorney, Agent, or Firm*—Hamilton, Brook, Smith & Reynolds

[57] ABSTRACT

A data flow processing system has a plurality of processing elements and memory units. Communication amongst processing elements and amongst processing elements and memory units is facilitated by an interconnection network. Each processing element is pipelined. The system operates upon data objects known as tokens. The tokens initiate activity within the processing element pipelines. Included within the activities initiated by the tokens is execution of instructions. Operands for instructions are matched in non-associative portions of memory known as activation frames. The activation frame memory locations have a state field that indicates whether a value is present or not in the activation frame. The state field may also indicate other information about an activation frame memory location. The state field is used to determine what action is taken at an activation frame memory location when an instruction is executed. The state field also determines the scheduling of execution of instructions. Moreover, the state field may be manipulated independent of a value held at an activation frame memory location.

79 Claims, 8 Drawing Sheets

| Token | | | |
|---|---|---|---|
| Tag-part | | Value-part | |
| TYPE 8 | TAG 64 | TYPE 8 | VALUE 64 |

Fig. 11

| TAG | | | | |
|---|---|---|---|---|
| PORT 1 | MAP 7 | IP 24 | PE 10 | FP 22 |

Fig. 12

| MAP | |
|---|---|
| HASH 2 | N 5 |

| HASH Field Encoding | | |
|---|---|---|
| HASH | Strategy | Use |
| 00 | FP | Word interleaved data structures |
| 01 | aliased FP | Constant data structures |
| 1x | | Reserved |

Fig. 13

| Instruction | | | |
|---|---|---|---|
| OPCODE 10 | r 10 | PORT 1 | s 11 |

Fig. 14

TAGGED TOKEN DATA PROCESSING SYSTEM WITH OPERAND MATCHING IN ACTIVATION FRAMES

The Government has rights in this invention pursuant to contract Number N00014-84-K-0099 awarded by the Department of the Navy.

RELATED APPLICATIONS

This Application is a continuation-in-part application of pending U.S. patent application Ser. No. 07/274,498, filed on Nov. 18, 1988, by Papadopoulos et al now abandoned.

The subject matter of this application is related to U.S. patent application, "Distributed Building of Service Request Lists" by Gregory M. Papadopoulos, filed on even date herewith. The present application is also related to pending U.S. patent applications: "Non-Busy Waiting Resource Control" by Barth et al., filed on Jul. 26, 1989, Ser. No. 07/385,733 now abandoned and "Lazy Data Structures" by Steven K. Heller, filed on Aug. 4, 1989, Ser. No. 07/389,571 now abandoned.

BACKGROUND OF THE INVENTION

Current data processing systems can be classified by the level at which they choose to employ parallelism. The degree of parallelism in a system is to a great extent more a product of how a system is programmed than its inherent characteristics. In single-instruction-single-data stream (SISD) systems, only one instruction is executed at a time, and only one data stream is used. The amount of parallelism in execution of instructions in such systems is minimal. Single-instruction multiple-data stream (SIMD) systems also execute only a single instruction at a time; however, they have multiple data streams and thus can act on multiple operands in parallel. As a result, they experience a higher level of parallelism in execution than SISD systems. An even higher level of parallelism is achieved in multiple-instruction-multiple-data-stream (MIMD) systems for both data and instructions are processed in parallel.

MIMD systems can be further classified by the level at which they extract parallelism, specifically, they can be classified by the size of the units of computation that they perform in parallel. Coarse grained systems are those in which relatively large units of computation are performed in parallel. Although the units of computation are performed in parallel, execution still proceeds sequentially within each unit. Fine grained systems, in contrast, perform small units of computation in parallel. Since the units of computation that may be performed in parallel in fine-grained systems are much smaller than in coarse-grained systems, fewer operations are performed sequentially and the inherent potential for parallelism is much greater.

Given this classification scheme, the greatest inherent potential for parallel activity rests with MIMD systems. Moreover, amongst MIMD systems, the greatest inherent potential for parallel activity is found with fine-grained systems. Such systems have small sized units of computation and provide for easy computation. Furthermore, processing elements that operate on fine grains of computation are readily composed to multiprocessor systems. The problem, however, in efficiently implementing such fine-grained systems is effectively controlling the extraordinary amount of parallel activity of the systems, particularly since the increase in parallelism results in a dramatic rise in inter-task communication. The increase in parallelism also presents complex computation scheduling synchronization problems.

Efforts to date at MIMD machines have produced only mildly encouraging results. Generally, such machines have used software as the primary tool for instilling parallelism. In programming such software, programmers have decided where to install parallelism and have had to account for the difficult interactions of the programs with the machine. As a result, the programmer has born the brunt of the burden for deciding how to bring about parallel execution. Given the complex and confusing nature of these decisions, MIMD machines have proven unappealing to most users. Moreover, the resulting software has tended to be difficult to debug, unreliable, and not portable. To make matters worse, these machines have not performed as well as expected, despite the level of effort required to operate them.

Data flow machines are a special variety of fine-grained machines that attempt to execute models of data flow through a data processing system. These models are known as data flow diagrams. Data flow diagrams are comprised of nodes and edges. The nodes represent instructions, and the edges represent data dependencies. To be more precise, the nodes represent operators and the edges represent operands. Data flow machines operate by processing the operands.

The data flow diagrams impose only a partial order of execution. The instructions are executed in data flow machines whenever the operands they require are available. Data flow machines are, thus, not constrained by the rigid total order of execution found in sequential machines. This flexibility allows data flow machines to schedule execution of instructions asynchronously. In contrast, sequential machines based on the von Neumann model execute instructions only when the instruction pointer is pointing to the instructions. The primary benefit of asynchronous scheduling is the greater exposure of latent parallelism.

Data flow machines can be further classified into two categories: dynamic and static. Dynamic data flow machines are those machines which can dynamically allocate an instance of a function. In other words, the memory required for an instance of a function need not be preplanned, rather it can be allocated when the function is executed. Static data flow machines, in contrast, can only statically allocate an instance of a function. As such, they must preplan the storage required for each instance of the function prior to execution.

The Tagged-Token Data Flow Architecture developed at the Massachusetts Institute of Technology is a leading example of a dynamic data flow machine. It is described in Arvind, S. A. Brobst, and G. K. Maa, "Evaluation of the MIT Tagged-Token Data Flow Project", *Technical Report CSG Memo*, MIT Laboratory for Computer Science, 1988. The tagged token data flow machine allows simultaneous applications of a function by tagging each operand with a context identifier that specifies the activation of the function to which it belongs.

In a tagged-token data flow architecture, the combination of the tag and the operand constitutes a token. The tags of two tokens must match if they are destined to the same instruction. Hence, the tagged token architecture must have a means for correctly matching the tags. An associative memory has been relied upon as the matching mechanism.

SUMMARY OF THE INVENTION

A data processing system of a preferred embodiment is comprised of at least one processing element and a plurality of memory locations. The processing element includes a processing pipeline of four stages. The first stage fetches instruction from memory to operate on a token. The second stage of the pipeline performs operand matching on the token as indicated by the fetched instruction. The third stage continues processing on the token by performing an ALU operation specified by the fetched instruction. Lastly, the fourth stage of the pipeline forms a new token or tokens from the results of the ALU operation and the fetched instruction. This data processing system is preferably a multiple processer data flow processing system.

The tokens referred to above are data objects that are comprised of two fields. The first field is tag that includes a pointer to the beginning of an activation frame and a pointer to an instruction. Activation frames are contiguous blocks of memory locations that are used to store information necessary to execute a block of instructions. In particular, they serve as the meeting ground for matching operands destined to the same data flow node. The instruction pointer points to the instruction that is to be executed when the given token is processed in the pipeline of a processing element. The second field of the token is simply a data value. In terms of the data flow model, this data value typically represents an operand value.

Each processing element includes not only a processing pipeline but also a token buffer. This buffer stores the tokens while they are waiting to be processed within the processing pipeline. Each processing element has its own token buffer. Moreover, each of the processing elements preferably operates in parallel with its counterparts. The token buffer is preferably comprised of the plurality of stacks that are prioritized such that tokens leave a higher priority stack for the pipeline before they begin a lower priority stack. Since the buffer is organized as a stack, it operates on a last in first out (LIFO) basis. It should be noted, however, that the buffer need not operate in this manner, rather it may operate on a first in first out (FIFO) basis. The LIFO approach, however, provides a more efficient implementation.

As mentioned above, the activation frames serve as a place for matching of operands for operands that are destined to the same data flow node. The activation frame memory locations are able to provide such operand matching because of their structure. In particular, each memory location within an activation frame includes a state field for indicating a current state of the memory location and a value field for holding a value. The state field may indicate a number of different types of information. For instance, it may indicate the data type of the value in a value field. Similarly, it may indicate whether a value is stored in the value field. It is this second type of indication that is utilized to implement the matching function.

The matching function is an important part of execution of arithmetic/logical instructions within the data processing system. The course of execution of an arithmetic/logical instruction begins with fetching of the instruction. Once the instruction is fetched, a memory location indicated by the instruction is accessed. Typically, this memory location is within an activation frame. Once the memory location is accessed, the state field is examined and the value field is operated on as determined by the arithmetic/logical instruction and the current value in the state field. Once the state field and value field have been operated on, the arithmetic/logical instruction is either performed or not performed, depending upon the current state of the memory location and the instruction.

The operations that are performed on the state field and value field is determined to a great extent upon the time at which the operand encoded by the token arrives at the memory location. In the typical course of events, a first operand of an instruction is stored in the memory location when the memory location is empty. Once it is stored in the memory location, the state field is changed to reflect that an operand of the instruction is stored in the memory location. Subsequently, a second operand of the instruction is received. Upon locating this second operand, the memory location is checked to see if the first operand is stored therein. Since the first operand is already stored in the memory location, it is read out of the memory location and sent with the second available operand to be further processed. It is preferred that after removing the first available operand from the memory location that the state of the memory location be changed to indicate that the memory location is empty. The above approach is applicable with dyadic operations; however, when monadic operations are specified by the instruction, the operand value of the current token is forwarded to the processing element without the necessity of examining the contents of the memory location.

As mentioned above, each token contains an instruction pointer within its tag field. When a token enters the first stage of the pipeline (i.e., the instruction fetch stage), this pointer is utilized to locate the particular instruction. Each instruction contains a matching rule for matching operands. It also contains a rule for computing an effective address of a storage location on which the matching rule operates. Additionally, the instruction contains an ALU operation to be performed by the ALU of the data processing system and lastly, a token forming rule for forming new tokens that result from execution of the instruction. The dyadic and monadic matching rules have been discussed above but the sticking matching rule has of yet, not been discussed. The sticking matching rule tells the system to write a value of a token into the value field of a location if the state field of the location indicates that another value is not present. When it writes such a value it changes the state field location to indicate that a value is now present. On the other hand, if the value of the token is a constant, this value is written into the value field, but the state field is changed to indicate that not a normal value is present but rather that a constant value is present. If a normal value is present within the value field and a constant value subsequently arrives, the constant value is exchanged for the normal value. Furthermore, once the constant value is written into the value field, it is not removed until explicitly cleared. All accesses to the memory location after that point merely read a constant value out of the memory location.

The rule for computing an effective address of a storage location as specified by the instruction, selects one of three possible addressing approaches. In the first of these options, the memory location is specified at an absolute address indicated by an offset that is contained within the instruction. In the second option, the memory location is an address located at the address specified by the activation frame pointer of the tag offset by the offset contained within the instruction. The third option employs yet another approach. In this final approach the memory location is at the address pointed to by the pointer to an instruciton offset by the offset contained within the instruction.

The ALU operation indicated by the instruction tells the system what operation is sought to be performed by the ALU on the operands. For instance, if the ALU operation was specified as an addition operation when the ALU operation stage of the pipeline acted on the given token, it would add the two operands passed to it. The final rule specified by the instruction is the token forming rule. This rule tells the system how to form new output tokens from the operations that have been performed. This rule is employed in the tag forming portion of the ALU operation stage as well as in the token forming stage.

The processing pipeline preferably contains a capability to handle exceptions. One means that may be employed is to have each activity associated with a token recorded as the token enters the pipeline. When an exception occurs, the value in the register remains unchanged until the exception is resolved. The resolution of the exception is performed by issuing an exception handling token. This exception handling token preferably may not be interrupted.

So as to insure no conflict between processing elements acting in parallel, each processing element is preferably assigned a given region of storage in which activation frames encode is stored with that processing element. A token may indicate the processing element for which it is destined by encoding within the tag a processing element designation.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 11 shows the fields of a token.

FIG. 12 shows the fields of a tag.

FIG. 13 shows the sub-fields of the map field and shows how interleaving strategies are encoded.

FIG. 14 shows the fields of an instruction.

DETAILED DESCRIPTION OF THE PREFERRED EMBODIMENT

Figure 1:
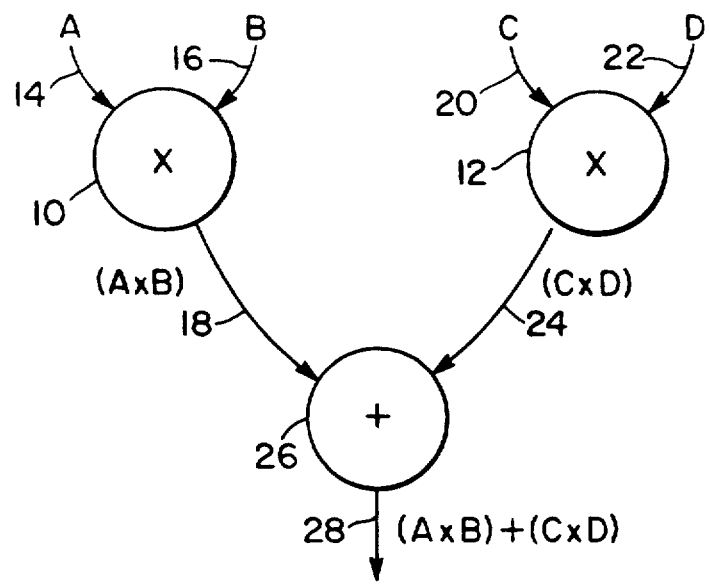
FIG. 1 shows a sample data flow diagram.

The preferred embodiment of the present invention includes a data flow multiprocessor system. As mentioned previously, data flow systems execute data flow diagrams. A sample data flow diagram is shown in FIG. 1. Specifically, FIG. 1 illustrates a data flow diagram for $(A \times B)+(C \times D)$. The operands (i.e., A, B, C, and D) are represented as edges, and the operators (i.e., $\times$ and $+$) are represented as nodes. Node 10 represents a multiplication operation. That node 10 has two input edges 14 and 16 that represent A and B respectively. The output edge 18 from node 10 has the value $A \times B$. Similarly, node 12, which also represents a multiplication operation, has input edges 20 and 22 that represent C and D respectively. Output edge 24 has the value $C \times D$. The two output edges 18 and 24 from these nodes 10 and 12 then enter an addition node 26. The resulting output edge 28 represents $(A \times B)+(C \times D)$.

In a traditional sequential machine, each of the operations represented by the nodes would be performed in sequential order. In the example shown in FIG. 1, the machine would first multiply A times B, then it would multiply C times D and lastly, it would add the product A times B and C times D. There is, however, no reason to impose such an order if the operands are available. Thus, in a parallel processing data flow machine, if the operands A, B, C, and D are available, the operations $A \times B$ and $C \times D$ are performed simultaneously. The resulting products are subsequently summed. By operating in this manner, the data flow machine substitutes the arbitrary sequential order imposed on such operations with an order imposed by the operations themselves.

Figure 2:
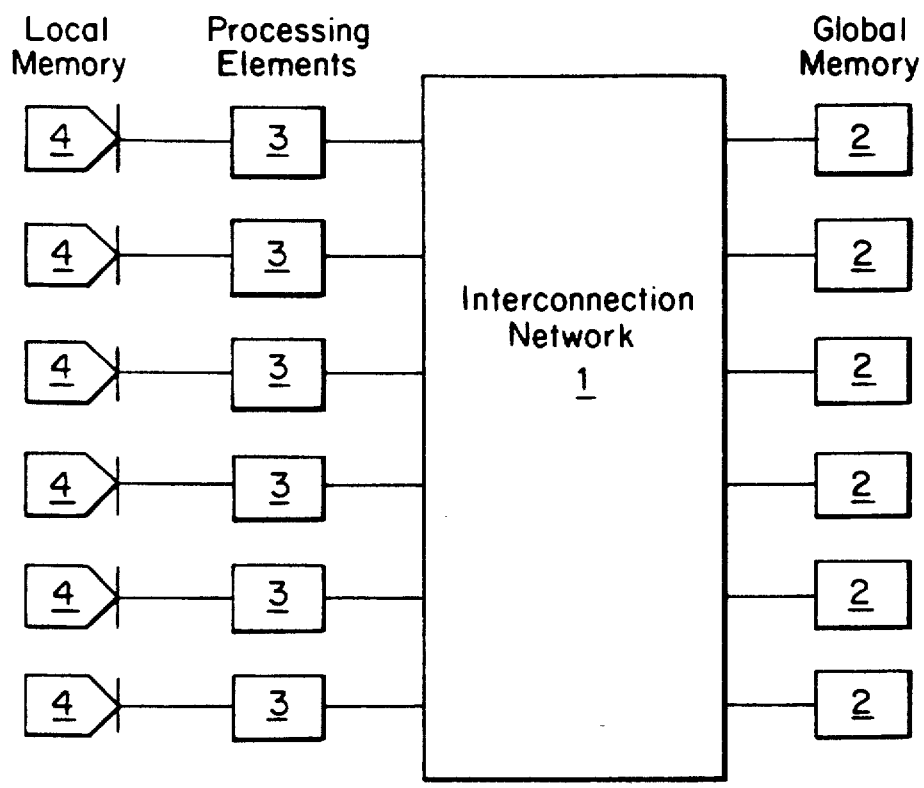
FIG. 2 shows the major components of the data flow machine.

A view of the major components of the preferred embodiment of the present invention is shown in FIG. 2. Specifically, the present invention includes a plurality of processing elements 3, each associated with an assigned region of memory 4, and global memory units 2. An interconnection network 1 comprised of logic circuitry is provided to facilitate communication amongst processing elements 3 as well as amongst global memory units 2 and processing elements 3. Each of the processing elements 3 may access any of the global memory units 2 and acts in parallel with the other processing elements 3.

Figure 3:
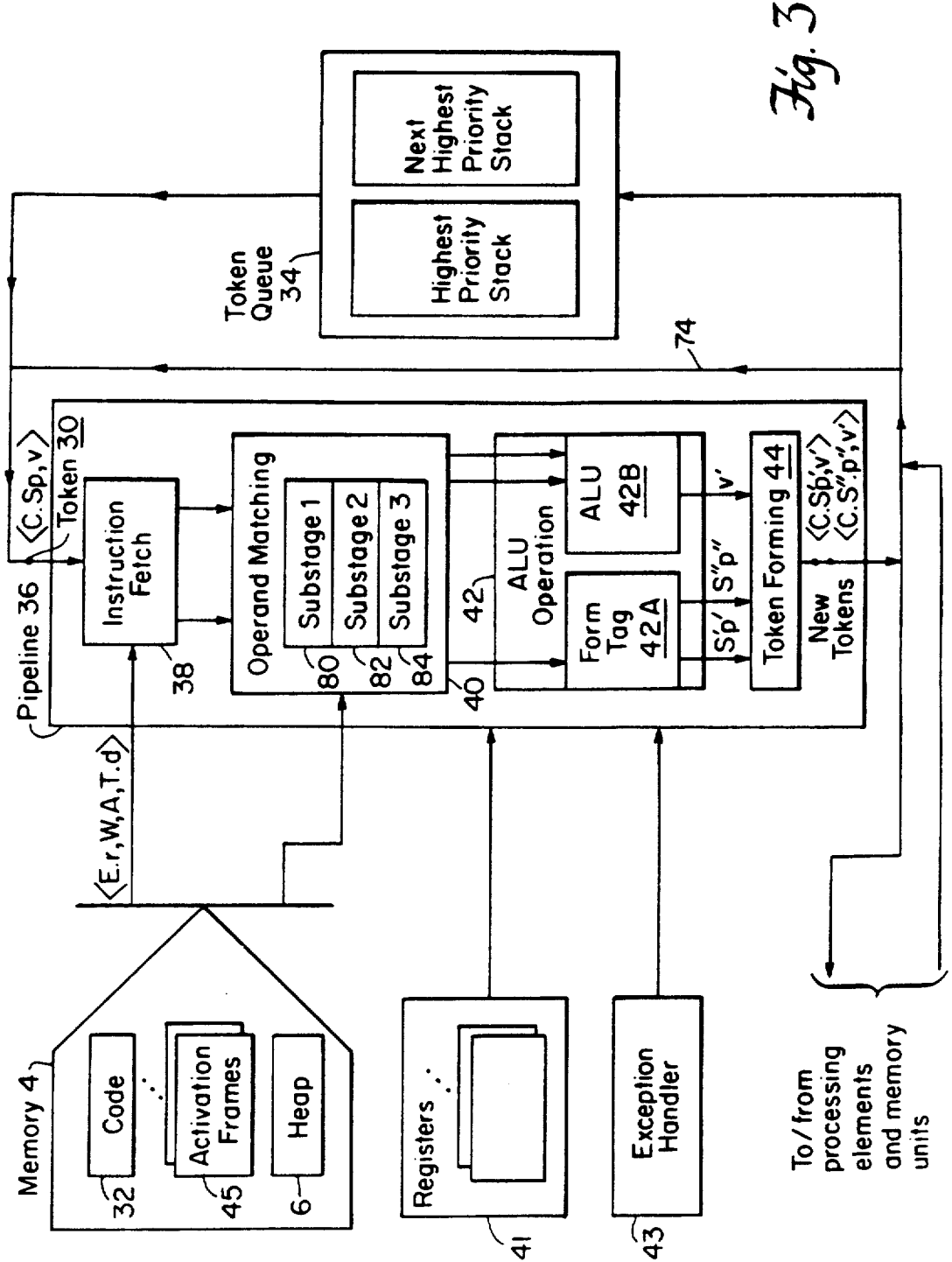
FIG. 3 shows the major components of a processor of the data flow machine.

FIG. 3 shows a typical processing element 3 in more detail. As can be seen in FIG. 3, each processing element 3 includes a processing pipeline 36. Also included is a token queue 34 for storing tokens waiting to be processed. An assigned local portion 4 of global memory is allocated for storing activation frames 45 and code 32 for processing use. To provide exception handling capabilities, an exception handler 43 and a set of registers 41 are provided within the processing element 3.

The memory 4 is distinguishable from the memory of traditional machines built under the von Neumann model. Instead of merely consisting of a value, each of the memory locations of the present invention comprises of two fields: a presence field and a value field. This memory organization in the present invention is significant, for it alters the common view of memory being merely a location for storing values. The dynamically assigned portion of memory 4 in the present invention has both a presence state and a value. The presence state may affect the value's significance, as well as alter the execution of instructions on the value. Further, the presence field may be manipulated independently from the value field. This design of memory makes it a more powerful tool, as will be more apparent from the discussion that follows.

The memory 4 is used to store activation frames 45, heap storage 6 and code sections 32. Alternatively, an implementation may have separate memories for code 32 and activation frames 45. Activation frames 45 can be viewed as all the locations required for the invocation of a function or a code block. They play a particularly important role in the present invention, for they constitute the working memory in which tokens with matching tags meet. Tokens will be discussed in more detail below.

In the present invention, tokens 20 (FIG. 3) are akin to embellished operands that identify not only the operand values but also identify the particular activation of an instruction to which they belong. In particular, a token 30 can be viewed as a tuple comprising a tag ($c.s_p$) and a value (v). A token 30, thus, is a tuple, ($c.s_p$,v). The tag identifies the instruction and activity associated with the operand that the token represents. The tag is comprised of three fields: a context pointer (c), a statement number (s), and a port indicator (p). The context pointer (c), points to the beginning of an activation frame 45 in which the operand represented by the token will be matched. The statement number (s) points to a specific memory location where the instruction of the operand is stored, and the port (p) indicates whether the token enters a node representing the instruction on the left input edge or the right input edge.

The processing element 2 of FIG. 3 is perhaps most easily viewed as a token processing system. It processes tokens 30 to bring about execution of instructions 32. In terms of the data flow model, this system processes operands to execute data flow diagrams, and it continues processing operands until told to stop. In more accurate terms, the tokens trigger the production of activities that are performed in the pipeline 36.

During operation of the system, within each processing element 2 tokens 30 leave the token queue 34 whereupon they enter the processing pipeline 36. Multiple tokens are typically present in different stages of the pipeline at any given time. Each such token is processed in parallel with the other tokens in the pipeline. Hence, the pipeline represents a second level of parallelism within the present invention that is distinct from the parallelism attributable to the simultaneous computations of multiple processors.

More than one token 30 may enter the pipeline at a time, but generally only one token enters the pipeline at a time. The number of tokens 30 that may simultaneously enter the pipeline 36 is dictated by the multiprocessing capability of the particular design employed; that is, each processing element may operate on multiple tokens in parallel. The first stage of the processing pipeline 36 is the instruction fetch stage 38. In this stage, the system looks at the statement number (s) contained in the tag of the incoming token 30. This statement number (s) corresponds to the memory location for the instruction that is to operate on the token 30. After determining the statement number, the system retrieves the instruction at that location (see the memory location pointed to by arrow 31 in FIG. 4).

An instruction of the present invention can be viewed as a tuple. In particular, an instruction equals (E.r, W, A, T.d) where E.r specifies a method of determining the effective address for the storage location on which the matching rule will operate; W specifies the matching rule; A specifies the ALU operation; and T.d specifies the token forming rule. These elements of the tuple need not be encoded by separate opcodes; rather, all may be encoded by a single opcode as will be seen below. In the preferred embodiment the instructions are limited to at most two operands. Thus, instructions traditionally having more than two operands must be broken down into combinations of instructions having at most two operands.

Once the instruction 32 is fetched, the token 30 and information from the instruction 32 are passed on to the operand matching stage 40 of the pipeline 36. In this stage, the system looks to match operands destined for the same node (i.e. those having like tags differing only as to port). This stage is the means for the system to check if all the operands necessary for execution of an instruction 32 are available or not. If they are available, the instruction 32 is executed. If they are not available the operand specified by the token is generally written into the matching location. The specifics of what occurs are discussed in more detail below.

The processing then continues in the next stage of the pipeline 36: the ALU operation stage 42 which is comprised of a tag former 42A and an ALU 42B. In general, the tag former 42A forms the tag portion of output tokens, and the ALU forms the value portion of output tokens. In this stage 42, the operation specified by the instruction is performed by an ALU 42B within the stage. Moreover, new tags for the results of the ALU operation are formed by the tag former 42A. The tag former 42A and ALU 42B may be further pipelined into substages so as to balance overall performance. The tags are formed in accordance with the token forming rule of the instruction being executed. The output from this stage 42 enters the token forming stage 44 where the output tokens are formed. The resulting output tokens that typically carry the result of the operation then may travel to a number of different locations. First, they may travel within the processing element 2 to the token queue 34 or to the pipeline 36. Second, they may travel to other processing elements 3, and third, they may travel to a memory unit 2. Where they travel is dictated by the tag portion of each output token, for the tag specifies a particular processing element 2 or memory unit 3 as will be discussed below.

If an output token 30 is traveling to a memory unit 2, the output token's tag specifies which memory unit 2 is to be accessed. The output token 30 also specifies the operation to be performed on the memory location (i.e. a read operation or a write operation). The memory controller of the memory unit 2, uses the operation specification to perform the desired operation. If a read is requested, the memory unit 2 produces a token 30 comprising the data read of out the memory unit 2 and a tag specifying a given processing element. Once produced, this token 30 travels to the appropriate processing element where it joins the other tokens 30 being processed by the destination processing element.

Outputs tokens 30 may also travel, as mentioned above, to other processing elements 3. In particular, upon exiting the pipeline 36 of the processing element 3 that produced them, they are directed to the interconnection network 1 where they travel to the processing element 3 specified by the tag of the token 30. Once there, they join other tokens at the processing element 3 and are processed. All of the tokens in a single processing element 3 have tags that specify the same processing element 3.

Bearing in mind the many different paths an output token 30 may follow, one can appreciate the diversity of communication options available in the present invention and the ease with which such communication are implemented. Each processing element 3 can communicate with all other processing elements and with any memory unit 2. To communicate with such components, it need only generate an output token having a tag that specifies the processing element 3 or memory unit 2 to which it is destined. Moreover, such communications can be performed in parallel with ongoing computations, for the processing elements 3 need not wait for a response to the communication.

In light of the above discussion, it should be apparent that there is a great deal of activity occurring in parallel within the present invention. To maintain proper synchronization certain ground rules must be followed. One of the ground rules is that an activation frame must first be allocated before it can be used. Thus, an activation frame is allocated for each routine that is performed. In particular, once a routine is to be called, the activation frame is allocated. This allocation is performed by the operating system. The operating system maintains a list of free activation frames such that when a request for a new activation frame is received, it simply pops an activation frame off the free list and assigns it to the call of the routine. Moreover, when the call to the routine is completed, the activation frame is added back on to the free list. In performing such allocations and deallocations, the operating system makes certain that the same activation frame is not assigned to multiple routine calls at the same time.

In the preferred system, each activation frame is processed by a specific processing element, and each processing element may be allocated thousands of activation frames. Since the activation frames are allocated as required and requested with execution of prior code blocks, the processing elements are called upon dynamically with execution of the code.

Routines are code blocks and calls to such routines are made by prior code blocks. These code blocks are defined by the compiler which decides which nodes of a data flow graph constitute a code block and thus share a single activation frame. The compiler, thus, establishes the interprocessor granularity of the process. Smaller code blocks characterize a fine grain system having greater potential for parallelism with increased interprocessor communications.

In this embodiment, code is not shared; rather each processing element 3 has a copy of the entire code in its assigned memory 4. All of the instructions encoded within the code are not performed by each processing element. Instead, only those instructions that are pointed to by the tokens processed by the given processing element 3 are executed by that processing element 3. Thus, only a proportional share of the entire code is typically performed by a given processing element. As an alternative, a cache system may be used to load code as required.

Figure 4:
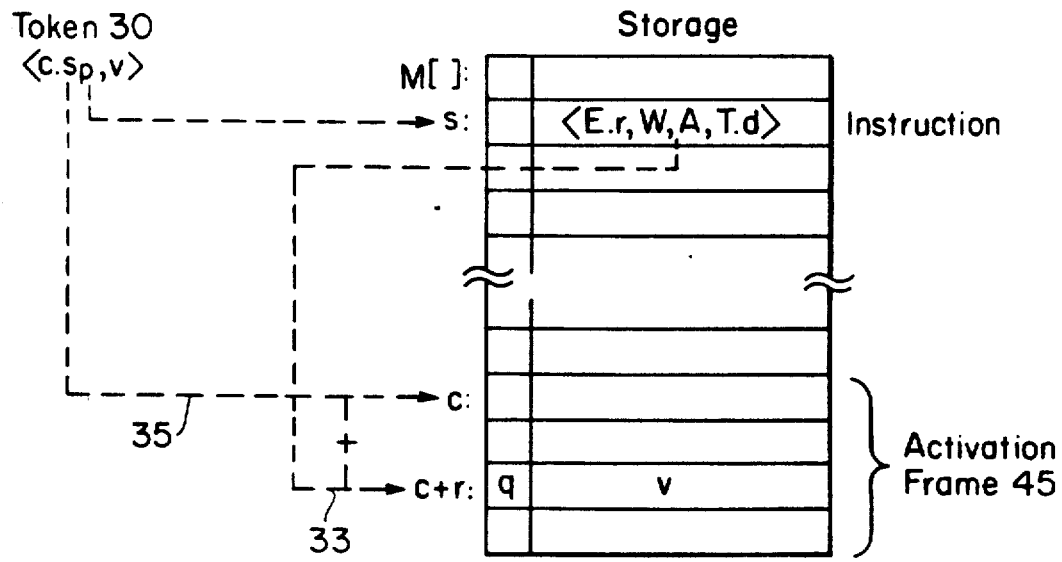
FIG. 4 shows the relationship between tokens, instructions, and activation frames.

Once the allocation frames are allocated and the code blocks are defined, the system can look to perform matching of operands. In particular, the operand matching stage 40 looks to the E.r field contained with the instruction 32 that is to be executed. The E.r field specifies one of three effective addressing modes. One possible effective addressing mode is frame relative mode. In frame relative mode, the address of the memory location is located within an activation frame 45 by adding an offset (r) to the context pointer (c) contained within the tap of the token 30. This scheme is illustrated in FIG. 4. Note the arrow 35 in FIG. 4 from c pointing to the beginning of the activation frame 45 and note the other arrow 33 pointing to the location specified by the context (c) plus the offset (r). In contrast, absolute mode specifies the address as the absolute address (r). Lastly, in code relative mode, the address is specified by the statement number from the tag plus the offset (r).

Once it has located the address on which the matching rule is to operate, the processing element 3 can then perform the matching rule. Matching rules are basically a means of generating activities. For illustrative purposes, an activity can be though of as a tuple (c.s, $v_l$, $v_r$, A, T.d) where c.s is the context pointer and statement number from the tag shared by the matching tokens; $v_l$ is the value of the token on the left port; $v_r$ is the value of the token on the right port; A is an ALU operation; and T.d is the token forming rule.

What matching rule is applied depends on the operation specified in the instruction and depends on the operands. The matching rule that is most commonly used operates on two operands. This rule is referred to as $W_{dyadic}$. When executing this rule, the system looks at the memory location within an activation frame specified by the effective address and checks the presence field. If a value is currently residing in the value field, the presence field equals "present", and if a value is not currently residing there, the presence field equals "empty".

Figure 5:
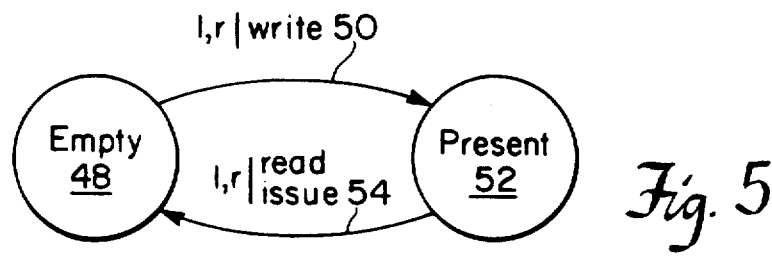
FIG. 5 shows the state transition diagram for the arithmetic matching rule.

If the location's presence field indicates that it is in the "empty" state 48 (FIG. 5), the system 50 writes the value of the token into the value field of that memory location and changes the presence field to the "present" state 52. On the other hand, if the presence field is initially in the "present" state 52, the value field of the memory location is read, and an activity is issued 54. How the issued activity is generated can be best explained in equation form:

$$(c.s_l, v_l), (c.s_r, v_r) \rightarrow (c.s, v_l, v_r, A, T.d)$$

wherein A and T.d are derived from the relevant instruction, and c.s, $v_l$, $v_r$ are derived from the tokens 30. In addition to issuing an activity, the rule changes the presence state from the "present" state 52 to the "empty" state 48.

This scheme greatly simplifies the task of matching operands in dyadic operations. There is no longer the need for costly associative memory. Further, if one operand arrives prior to another it is not lost. Rather, it merely waits until the other is available. This aspect of the scheme reflects the asynchronous nature of the scheduling of execution of the instructions. In addition, a location in an activation frame need only be large enough to store a value and a state. The incoming tag of the first token to arrive may be discarded as it can be reconstructed from the tag of the second token to arrive.

If a monadic operator is specified, a different matching rule is applied. This rule is denoted $W_{monadic}$. By convention the left input port is used for input in monadic operations. In accordance with this matching rule, the value field of the token on the left input port is read and an activity is issued. The presence state is not affected. The activity takes on the context (c), statement number (s), and value ($v_1$) of the input token on the left input port. In particular, $$(c.s_1,v_1) \rightarrow (c.s_1,v_1,v_1,A,T.d)$$

Another possibility is that a dyadic operator is specified but with a constant operand. If that is the case, the sticky matching rule denoted as $W_{sticky}$ is applied. It is called a sticky matching rule because once the constant is written into the location, it is not extracted on subsequent accesses. Constant operands to which this rule is applied are of two types. The first type is literal constants which are those known at the time of compilation. The second type is frame constants which are those values that may be established in an activation frame to be shared by many activities within a given invocation of a code block.

Figure 6:
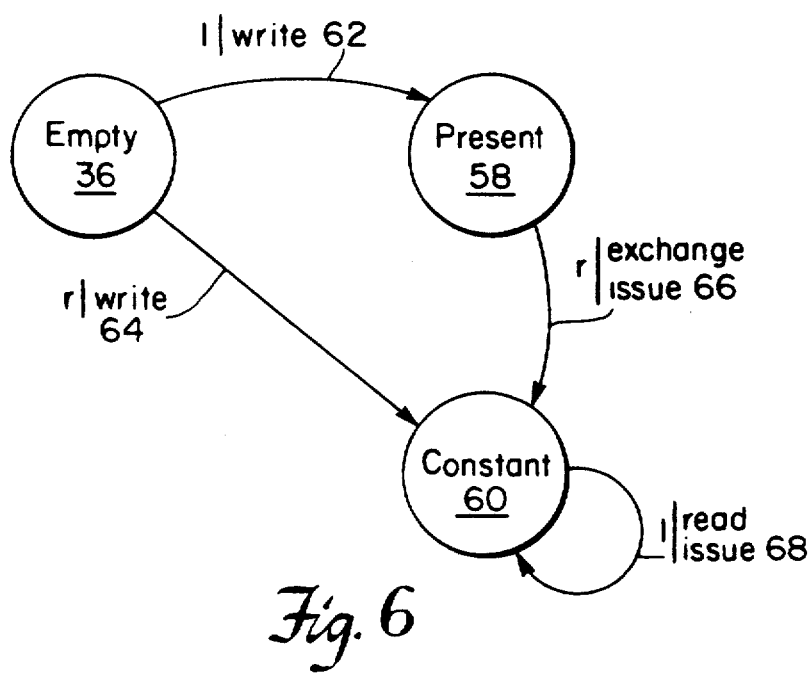
FIG. 6 shows the state transition diagram for the sticky matching rule.

FIG. 6 shows the state transition diagram of $W_{sticky}$. It allows a single active operand to be written into the location specified by the effective address prior to the arrival of the constant. In particular, if the presence state is the "empty" state 56 and an active operand is in the matching stage, the operand's value is written 62 into the location, and the presence state is changed to the "present" state 58. Note that the active operand must be at the left port input. If the constant arrives after the active operand (i.e., an input operand subsequently arrives on the right port), the value of the constant is exchanged with the value of the operand in the location, and an activity is issued 66. The presence state is changed to the "constant" state 60.

Suppose, on the other hand, that the location is initially in the "empty" state 56 and that the constant arrives on the right port input prior to the active operand and on the left port input. In that case, the constant is written at the specified memory location 64, and the presence state is changed to the "constant" state 60. Once the constant is written into the memory location, the arrival of a subsequent active operand on the left port input does not alter the presence state but, instead, results in reading of the constant and issuance 68 of an activity. For this rule to work effectively in this embodiment, constants must enter on the right port and non-constants must enter on the left port.

It should be pointed out that the presence state need not be limited to encoding the presence or absence of a value, rather the presence state may also encode other information such as data types. Furthermore, the presence state may dynamically alter the execution of an instruction. For instance, if an instruction specifies the sticky matching rule, the operation performed at the memory location on which the matching rule acts is determined by the presence state. Thus, the instruction is conditioned on the presence state and performs different operations given different presence states.

Once the activities are generated, the activities are passed on to the next stage of the pipeline 36: the ALU operation stage 42. The central aim of this stage is to produce tags and values to pass on to the token forming stage 44. This stage relies on the A and T.d fields on the instruction 32 to direct system activity.

In the ALU operation stage 42, the token forming rule, T.d, specifies how the new tags and values are to be formed. The tags formed are in large part determined by the d field of the token forming rule. The d field specifies the destination addresses to be given the newly formed tokens. In particular, d equals (s1.p', s2.p''). The tag for the first newly formed token is generally $c.s'_{p'}$, where $s'=s+s1$, and the tag for the second token is generally $c.s''_{p''}$ where $s''=s+s2$.

Figure 7:
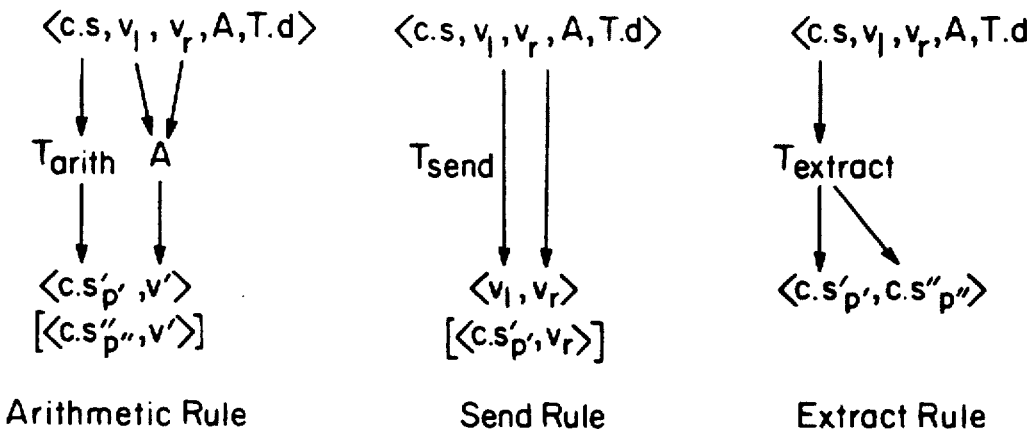
FIG. 7 shows the effect of the three basic token forming rules.

There are three basic token forming rules (See FIG. 7). The first is the arithmetic rule denoted as $T_{arith}$. It directs the ALU operation stage to apply the ALU operation (A) to the two values ($v_1$, $v_r$) in the activity to generate an output value (v'). At least one token is produced and a second token (noted in brackets in FIG. 7) may be produced. The output tags for the tokens ($c.s'_{p'}$ and $c.s''_{p''}$) are generated by applying increments (s1 and s2) to the statement number (s) contained in the incoming tags and by supplying new ports (p' and p'') as specified by the d field of the token forming rule. Note that under this rule these output tokens have the same context as the original tokens.

The second token forming rule, the send rule, is denoted as $T_{send}$. It sets the output token tag equal to the left value ($v_1$) of the activity which is data type TAG, and it sets the output token value equal to the right value ($v_r$) of the activity. It can generate another token if necessary, but it generates the new token's tag in the same manner as they are generated in the arithmetic rule by adding an increment to the stated number. The value field of the second output token is set equal to the right port value ($v_r$). The primary aim of this rule is to send a value to a different context. As such, it provides an inter-activation communication capability.

The third and final basic rule is the extract rule, $T_{extract}$ which sends a value equal to the current context to an instruction within the current context. It can only generate one output token. It generates the two new tags $c.s'_{p'}$, $c.s''_{p''}$ from the activity tag (c.s) by adding increments (s1 and s2) to s as is done in the arithmetic rule. The first generated tag ($c.s'_{p'}$) is used as the output token's tag, and the second tag ($c.s''_{p''}$) is used as the output token's value.

These three basic forming rules are also used in conjunction to produce additional token forming rules. For example, the extract rule and the send rule may combined to form an extract-send rule that sends a tag from within one context ($\hat{c}$), as an argument to another context (c). In particular, if $v_1$ equals a tag ($\hat{c}.\hat{s}_{\hat{p}}$) specifying the new context, the output token equals $$(\hat{c}.(\hat{s}+s2)_{p''}, c.s'_{p'}).$$

Another example of a combination token forming rule is the inc-s-send rule denoted as $T_{inc-s-send}$. It allows an adjustment to the new s field by employing the second increment (s2) and the second port indicator (p'') of the d field. In equation form, $T_{inc-s-send}$ can be represented by:

$$(c.s, \hat{c}.\hat{s}_{\hat{p}}, v_r, A, T_{inc-s-send}.d) \rightarrow (\hat{c}.(\hat{s}+s2)_{p''}, v_r)$$

This instruction is used primarily for passing arguments and results.

An additional combination token forming rule is the $T_{fetch}$ rule. It combines all three of the basic token forming rules. This rule is used to read elements from an array where $\hat{c}$ is the base address and $v_r$ is an index. Specifically, $$(c.s, \hat{c}.\hat{s}_{\hat{p}}, v_r, inc-c, T_{fetch}.d) \rightarrow ((\hat{c}+v_r).\hat{s}_{p''}, c.s'_{p'})$$

Also worth mentioning is the specially defined switch matching rule denoted as $T_{switch}$. It acts in a manner consistent with the switch instruction discussed below. In particular, (c.s, $v_l$, TRUE, A, $T_{switch}$.d)→(c.s'$_{p'}$, $v_l$) and (c.s, $v_l$, FALSE, A, $T_{switch}$.d)→(c.s''$_{p''}$, $v_l$).

It can be seen that only when the arithmetic rule is applied does the ALU field (A) of the instruction have much significance in the token forming process. In all other cases, the token forming rule dictates the output tag and output value. Further, it should be noted that there is a close relationship between the token formation stage 44 and the ALU operation stage 42. Both rely heavily on the token forming rules (T.d). The difference between the stages is that the ALU operation stage 42 only produces non-joined output tags and output values. The combining of these outputs to produce output tokens is accomplished by the token formation stage 44.

Figure 8:
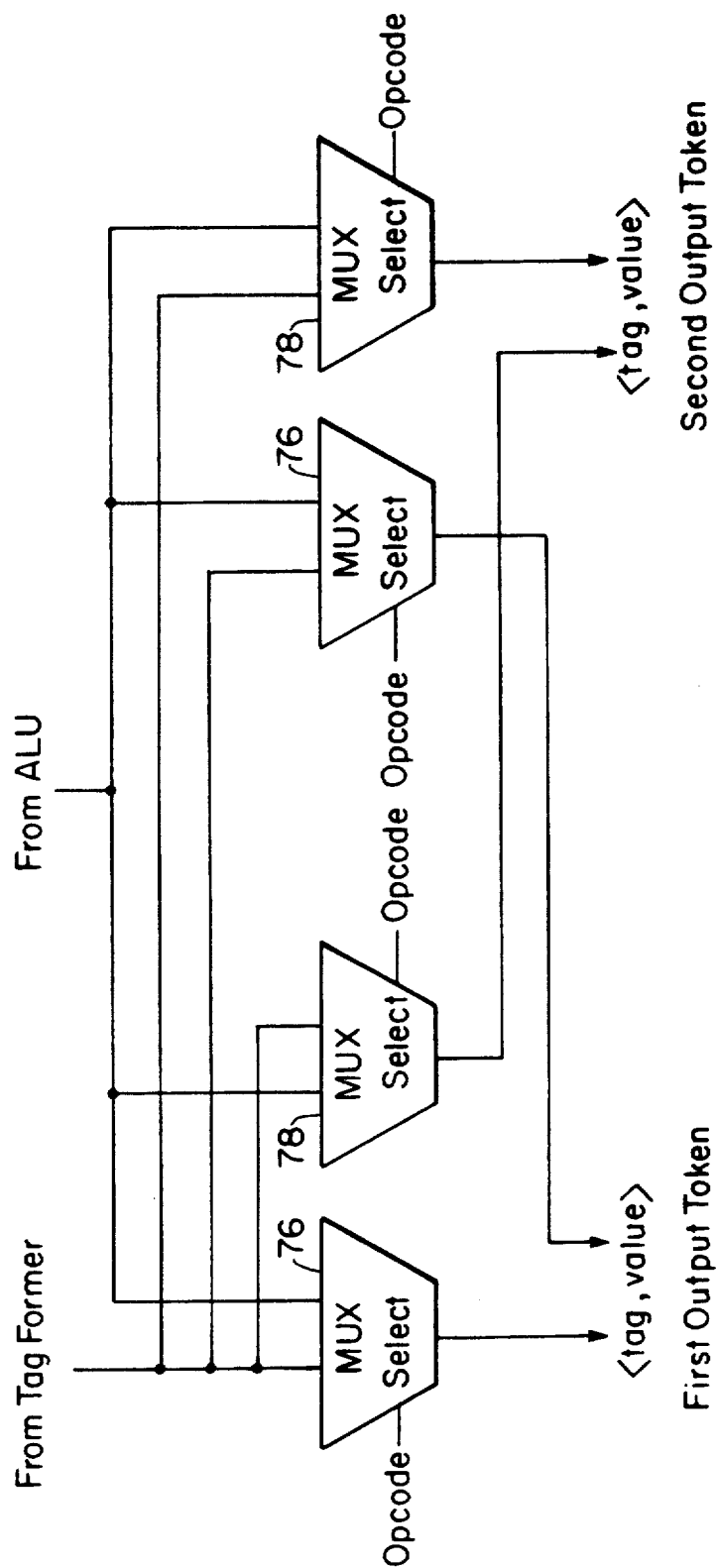
FIG. 8 shows the major components of the token forming stage of the pipeline.

The token formation stage 44 can be implemented with the assistance of a number of multiplexers (76 and 78 in FIG. 8). In particular, the values and tags produced by the ALU operation stage 42 are fed into multiplexers which select the appropriate combinations as dictated by the token forming rule (T.d). There are multiplexers 76 for the tag portion of the tokens 30 and multiplexers 78 for the value portions of the tokens 30. The select lines of the multiplexer are controlled by the opcode (T.d) of the instruction. The opcodes will be discussed in greater detail below.

Tokens 30 generated by the token forming stage 44 typically exit the pipeline 36 and return to the token queue 34. They are subsequently processed by the pipeline 36. Thus, there is a continuous flow through the pipeline until execution is completed. They may, however, travel to other destinations. The token forming stage 44 contains logic that examines the output token to see where it is destined and routes the output token accordingly.

The other destinations that output tokens may travel include other processing elements 3 and memory units 2. An output token may travel to another processing element when a change-tag instruction (which will be described below) is executed that sends the output token to a new context associated with a different processing element 3. Further, an output token may travel to a memory unit 2 when a memory access instruction is specified by the tag. Such memory access instructions (e.g., read, write) are handled asynchronously by the memory units 2.

The processing element need not wait while the memory access is being performed, rather it continues the processing. The actual memory access is performed by a controller within the particular memory unit 2 that is accessed. If appropriate, a token is sent by the memory unit 2 back to a given processing element 3 when the memory access is completed. Such asynchronous memory accesses constitute a third level of parallelism of the present invention, for the memory accesses are performed in parallel with the computations of the pipelines 36 of the various processing elements 3.

Thus far, little has been said of the token queue 34. A traditional queue may be used, but one optimization is for the queue to be comprised of a series of stacks (See FIG. 3). The idea behind the use of stacks is to try to create a sort of cache queue. A FIFO buffer would be useful, but not as practical for the present purposes. A FIFO would not easily provide for priority scheduling since, in a FIFO scheme, all tokens must wait their turn to be processed. Moreover, a FIFO controls parallelism in the wrong way. If the tasks to be executed are viewed as a tree wherein those tasks that must be executed early in the execution process to allow other tasks to be executed are near the top of the tree, a FIFO approach would unfold the tree in a breadth-first manner. What is desired is an approach that can control unfolding of the tree in a depth-first manner. A LIFO approach can control unfolding in such a depth-first manner. The LIFO approach induces more locality than the FIFO approach. More importantly, a LIFO queue can be cached from local memory, whereas a FIFO queue is difficult to cache.

The preferred embodiment uses stacks that are organized by priority. The tokens 30 are removed off the highest priority stack 70 (FIG. 3) until it is empty. Once the highest priority stack 70 is empty, the tokens 30 are removed from the next highest priority stack 72. This continues until execution is complete. A preferred implementation is to utilize only two stacks. Most tokens enter the highest priority stack 70, but some tokens are set aside in the next highest stack 72 to delay their processing.

One option that may be used to determine priority for purposes of deciding which stack a token 30 enters is to encode the priority in the token 30 as part of the tag. This option has the advantage of being dynamic but results in an increase in the complexity of the system. Such an approach can encode priority dynamically but can also permit static control. The other option is to have the priority encoded in the destination as specified by the d field of the token forming rule of an instruction. This option is more static than encoding priority in the tag but has the benefit of being readily implemented.

This stacking scheme allows for high priority tokens 30 to be processed quickly and early on in the execution of the instructions. This characteristic allows instructions which are condition precedents to the execution of a number of waiting instructions to be fully executed early in the execution process so as to free the path for execution of the waiting instructions. The net result is greater control over exposed parallelism.

Another optimization embodied within the present invention is to provide a direct path (74 in FIG. 3) for output from the pipeline 36 back into the pipeline 36 input. This path 74 bypasses the token queue 34. As a result, only a single port queue is required since only one output or one input as needed for a given cycle. If two output tokens are produced by the pipeline 36, one of the tokens 30 follows the bypass path 74 to be recirculated into the pipeline 36, and the other enters the token queue 34. If only one output token is produced by the pipeline 36, it follows the bypass path 74. If no token is then produced, a token is removed from the token queue 34 and inserted into the pipeline 36.

The present invention also concerns an optimization for exception handling. The system included in the present invention includes a special register set (41 in FIG. 3). This register set 41 records activities in the pipeline 36. In particular, it records the tag, the left value ($v_l$), and the right value ($v_r$) of each activity in the pipeline 36. These registers figure into system operation when an exception occurs. An exception is an event such as mismatched data types in an operation, an attempt to divide by zero, etc.

When an exception does occur, it is noted in the ALU output. The system then freezes the value of the activity which caused the exception in the register 41 and flags the activity which had an exception. A noninterruptable token is generated to call an exception handling operation. This new token follows the bypass path 74 directly back into the pipeline 36. The new token activates the exception handler 43 which consults the activity frozen in the register 41 to decide whether to interpret or restart the offending instruction. After the exception handler 43 has made its decision, processing continues as usual.

As is evident from the above discussion, the instruction set plays a particularly important role in system operation. The instruction set is comprised of several different classes of instructions. One of the major classes of instructions is the dyadic arithmetic instruction class. This class of instruction perform arithmetic operations on two input operands. A typical example of a dyadic arithmetic instruction is the add instruction. This instruction can be summarized as:

| add Inputs: | Outputs: |
|---|---|
| $(c.s_l, v_l)$ | $(c.s'_{p'}, v_l + v_r)$ |
| $(c.s_r, v_r)$ | $[(c.s''_{p''}, v_l + v_r)]$ |
| Where | |
| ALU rule $A = +$ | |
| and token forming rule $T = T_{arith}$ | |

It produces a value that is the sum of two input operands. Another example is the fgeq instruction. This instruction can be summarized as:

| fgeq Inputs: | Outputs: |
|---|---|
| $(c.s_l, v_l)$ | $(c.s'_{p'}, v_l \geq v_r)$ |
| $(c.s_r, v_r)$ | $[(c.s''_{p''}, v_l \geq v_r)]$ |
| $A = \geq$ | |
| $T = T_{arith}$ | |

It returns a value of TRUE if the first operand is greater than or equal to the second operand and returns FALSE otherwise.

A second class of instructions completes the set of arithmetic instructions. This second class is known as the monadic arithmetic instructions. They, like their dyadic counterparts, perform arithmetic operations. They, however, only act on one operand as opposed to two operands. A leading example of a monadic arithmetic instruction is the float instruction. This instruction can be summarized as:

| float Input: | Outputs: |
|---|---|
| $(c.s_l, v_l)$ | $(c.s'_{p'}, float(v_l))$ |
| | $[(c.s''_{p''}, float(v_l))]$ |
| $A = float$ | |
| $T = T_{arith}$ | |

It converts an integer operand into a floating point number.

Identity instructions represent an additional class of instruction. A primary instruction of this class is the identity instruction. This instruction can be summarized as:

| identity Inputs: | Outputs: |
|---|---|
| $(c.s_l, v_l)$ | $(c.s'_{p'}, v_l)$ |
| | $[(c.s''_{p''}, v_l)]$ |
| $A = nop$ | |
| $T = T_{arith}$ | |

The identity instruction passes the value of the input operand to another context. The gate instruction, in contrast, can be summarized as:

| gate Inputs: | Outputs: |
|---|---|
| $(c.s_l, v_l)$ | $(c.s'_{p'}, v_l)$ |
| $(c.s_r, x)$ | $[(c.s''_{p''}, v_l)]$ |
| $A = nop$ | |
| $T = T_{arith}$ | |

The gate instruction differs in that it copies the operand of the left input port and forwards that value when a value, called a trigger, is received on the right input port.

Conditional instructions are used to institute conditional execution. The sole conditional instruction employed is the switch instruction. It demands two input operands. One of the input operands must be a value, and the other input must be a boolean. It produces one of two possible output value choices for the given inputs. Which output value is chosen depends on the value of the boolean input. If the boolean input is TRUE, the first output is chosen:

| switch - TRUE Inputs: | Outputs: |
|---|---|
| $(c.s_l, v_l)$ | $(c.s'_{p'}, v_l)$ |
| $(c.s_r, TRUE)$ | |
| $A = nop$ | |
| $T = T_{switch}$ | |

If the boolean input is FALSE, the second output token is chosen:

| switch - FALSE Inputs: | Outputs |
|---|---|
| $(c.s_l, v_l)$ | $(c.s''_{p''}, v_l)$ |
| $(c.s_r, FALSE)$ | |
| $A = nop$ | |
| $T = T_{switch}$ | |

Tag manipulation is carried out by a special class of tag manipulation instructions. This class contains three basic instructions. The first such instruction, change-tag, can be summarized as:

| change - tag Inputs: | Outputs |
|---|---|
| $(c.s_l, \hat{c}.\hat{s}_{\hat{p}})$ | $(\hat{c}.\hat{s}_{\hat{p}}, v_r)$ |
| $(c.s_r, v_r)$ | $[(c.s''_{p''}, v_r)]$ |
| $A = nop$ | |
| $T = T_{send}$ | |

It is useful in communicating values between contexts. As noted, it requires two inputs. The value of the left input denotes the new context, and the value of the right input equals the value to be forwarded to the new context. Together these two input values comprise an output token. In addition, there is provided the option of producing a second output token in the current context having the right input's value.

Extract-tag, in contrast, can be summarized as:

| extract-tag Input: | Output: |
|---|---|
| $(c.s_1, x)$ | $(c.s'_{p'}, c.s''_{p''})$ |
| A = nop | |
| T = $T_{extract}$ | |

It is restricted to a single output. The resulting output token has a tag that shares the context with the input operand. It has a statement number that is sum of an increment with the statement number of the input. Moreover, the value field of the output token equals a tag in the same context as the input but has a statement number that is the sum of an additional increment with the statement number.

The adjust-offset instruction can be summarized as:

| adjust - offset Inputs: | Outputs: |
|---|---|
| $(c.s_1, c.s_p)$ | $(c.s'_{p'}, c.(s + i)_p)$ |
| $(c.s_r, i)$ | $[(c.s''_{p''}, c.(s + i)_p)]$ |
| A = inc - s | |
| T = $T_{arith}$ | |

It provides a more complex operation. It utilizes two inputs. The first input's value specifies a new tag, and the second input's value specifies an offset. This instruction produces up to two output tokens. The first output token is in the same context as the inputs and has a value equal to the first input's value offset by the second input's value. The second output token also has the same value and shares the same context with the inputs, but its statement number is offset.

Other instruction classes exist, however, they are not of significance to the present discussion. Nevertheless, it should be noted that the present invention is not limited exclusively to the instructions discussed in detail but rather, encompasses the entire set of instructions embodied by the described classes.

The present system can readily provide for iterative operations, such as loops. It provides for loop implementation by assigning each iteration of a loop a new context. It then uses a change-tag instruction on the new context to send to the current iteration the tokens from the previous iteration. When the iteration is complete, it frees the context so that the context can be assigned to the next iteration. As such, the parent context can be passed from iteration to iteration. Hence, the loop unfolds during execution as a tail recursion of the N activation frames, where N is the number of iterations in the loop. To maintain efficiency in this approach, activation frames used in loops are recycled.

In general, an activation frame is allocated every time a procedure is called. The operating system of the data flow processing system maintains a list of free activation frames. When a procedure is called it pops an activation frame off the free list. Similarly, when a procedure call is completed, it no longer needs the activation frame so the activation frame it used is returned to the free list.

The preferred embodiment of the present invention is a multiprocessor system. It, thus, must be able to communicate readily amongst processing elements 3. The preferred embodiment provides this capability by allowing tokens to freely flow from one processing element to another. Moreover, the present invention is easily composed from individual processing elements. Since the same entities account for intra-processor traffic as well as inter-processor traffic, composition of multiple processing elements into a multiple processor system is easily achieved. Further, the fine-grained nature of the computations that are performed in parallel, likewise, allows such easy composition of single processing elements 2 into the multiple processor system. The fine-grained nature of the system also provides the benefit of facilitating easy compilation of code.

Figure 9:
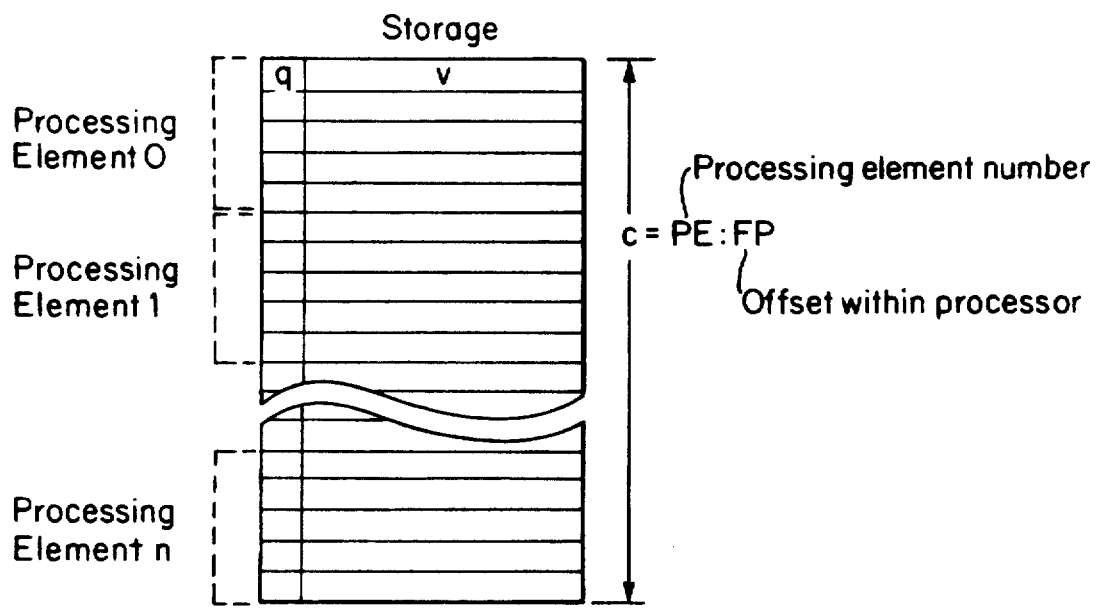
FIG. 9 shows the partitioning scheme of memory amongst processing elements.

Since the present invention is a multiple processor system, there must be a means of partitioning processes amongst the various processing elements 2. A simple and workable approach is to assign each processing element a region of storage (See FIG. 9). The tokens specify the processing element 2 that is assigned a given context through their tags. In particular, the two leading bits of the context pointers indicate the appropriate processing element. This approach has the advantage of removing the possibility of interprocessor conflict and the advantage of providing rapid access to memory. The assignments of storage space is not necessarily fixed; hence, space used an an activation frame by one processing element 2 may subsequently be used by another processing element 2. Thus, the approach has the additional advantage of making it possible to dynamically reallocate the partitions.

One disadvantage of partitioning the address space, as such, concerns the allocation of large data structures. The present system interleaves such large data structures across multiple processors to produce an even distribution of network traffic and processor loads. This interleaving is performed word-by-word. Non-interleaved and interleaved approaches are provided for by conceptually dividing the address space into regions where increments to the context advance either within a processor or across processors depending on the subdomain specified.

Figure 10:
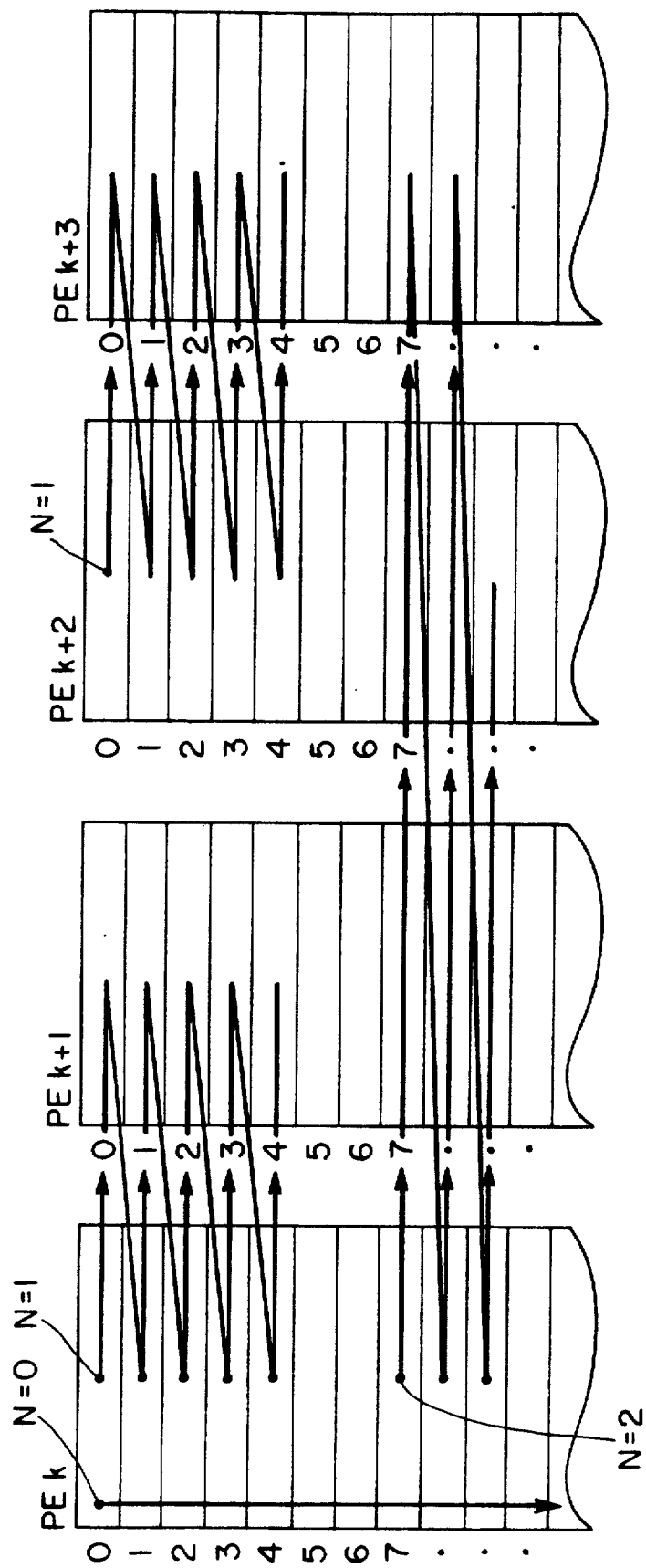
FIG. 10 illustrates the interleaving strategies.

A subdomain is a collection of $2^N$ processing elements wherein N is specified in the N field as established by the tag of the token (described below in the discussion of decoding). If N=0, any increments to c map on to the same processing element (See FIG. 10). If N=1, however, any increments to c alternate between two processing elements. If N=2, increments to c alternate between four processing elements, and so on. FIG. 10 illustrates the basic operation of this approach.

Given that each processor is assigned exclusive activation frames, the question arises whether code is also shared. Generally, it is preferred that a copy of the code for each code block be present on every processing element that executes the code block. Hence, the destination instructions are local and non-blocking. The result is to heighten design simplicity at the minimal cost of a larger memory. Alternatively, a cache system may be utilized.

It was noted previously that each memory location has associated presence bits. It is helpful if a large number of these presence bits can be changed simultaneously with a single instruction. To facilitate this capability, presence bits for adjacent locations are coalesced into words of the size equal to a machine word. In the preferred embodiment, there are two presence bits for each memory location. Thirty-two bits constitute a word. Thus, 16 sets of presence bits are stored as a word.

Another concern in implementing the system is the word length chosen. The preferred embodiment utilizes a 72 bit word wherein 64 bits are a value field and 8 bits are a type field. Tokens are comprised of two words (See FIG. 11). The first word is the tag and the second word is a value-part. Tags are of data type, TAG, whereas value-parts may be of several data types including TAG, FLT (floating point), INT (integer) and BITS (unsigned integer).

Tags can be further broken down into a number of fields (See FIG. 12). The leading bit of a tag indicates the port of the operand. A zero indicates the left port, and a one indicates the right port. The next 7 bits are the MAP field (See FIG. 13). The first 2 bits of the MAP field are the HASH indicator which selects an interleaving strategy. The strategies are listed in the table of FIG. 13. The other 5 bits are N field which equals the logarithm base two of the number of processors in the subdomain.

Following the MAP field is a 24 bit IP field that gives the instruction pointer address of an instruction on a processor number specified by the processor element, PE, field. With memory access tokens, the PE actually specifies a memory unit 2 rather than a processing element 3. The PE follows the instruction pointer, IP, field, that points to an instruction in memory and is 10 bits long. The final field of a tag is the FP field. It is a frame pointer and is 22 bits long. It points to the particular frame amongst those assigned a particular subdomain.

The tag c.s is formed primarily out of the PE, FP and IP fields. In particular, c is comprised of the frame pointer FP, and the processing element designation PE such that PE comprises the most significant bits of c and FP comprises the least significant bits of c. Further, s is comprised of PE and IP. PE comprises the most significant bits of s, and IP comprises the least significant bits of s.

Instructions are only 32 bits long and comprised of only four fields: OPCODE, r, PORT and s (See FIG. 14). OPCODE is 10 bits long and specifies an instruction OPCODE. Also 10 bits long is r. It is an unsigned offset used to compute the effective address of the operand. PORT defines the port for the destination tags. Lastly, s is an offset to IP for one of the destination tags in twos complement form. If two destination tags are required by a given instruction, the second tag is generated by adding 1 to the incoming IP and setting port to 1.

Knowing the formats for the tags, tokens and instructions, one can look at the operand matching stage 40 of the pipeline 36 in more detail (FIG. 3). Specifically, the operand matching stage 40 can be subdivided into three substages. The first substage 80 computes the effective address of the memory location where the operand matching takes place. The second substage 82 operates on the presence bits, and the third substage 84 either fetches or stores the operand at the effective address.

Figure 15:
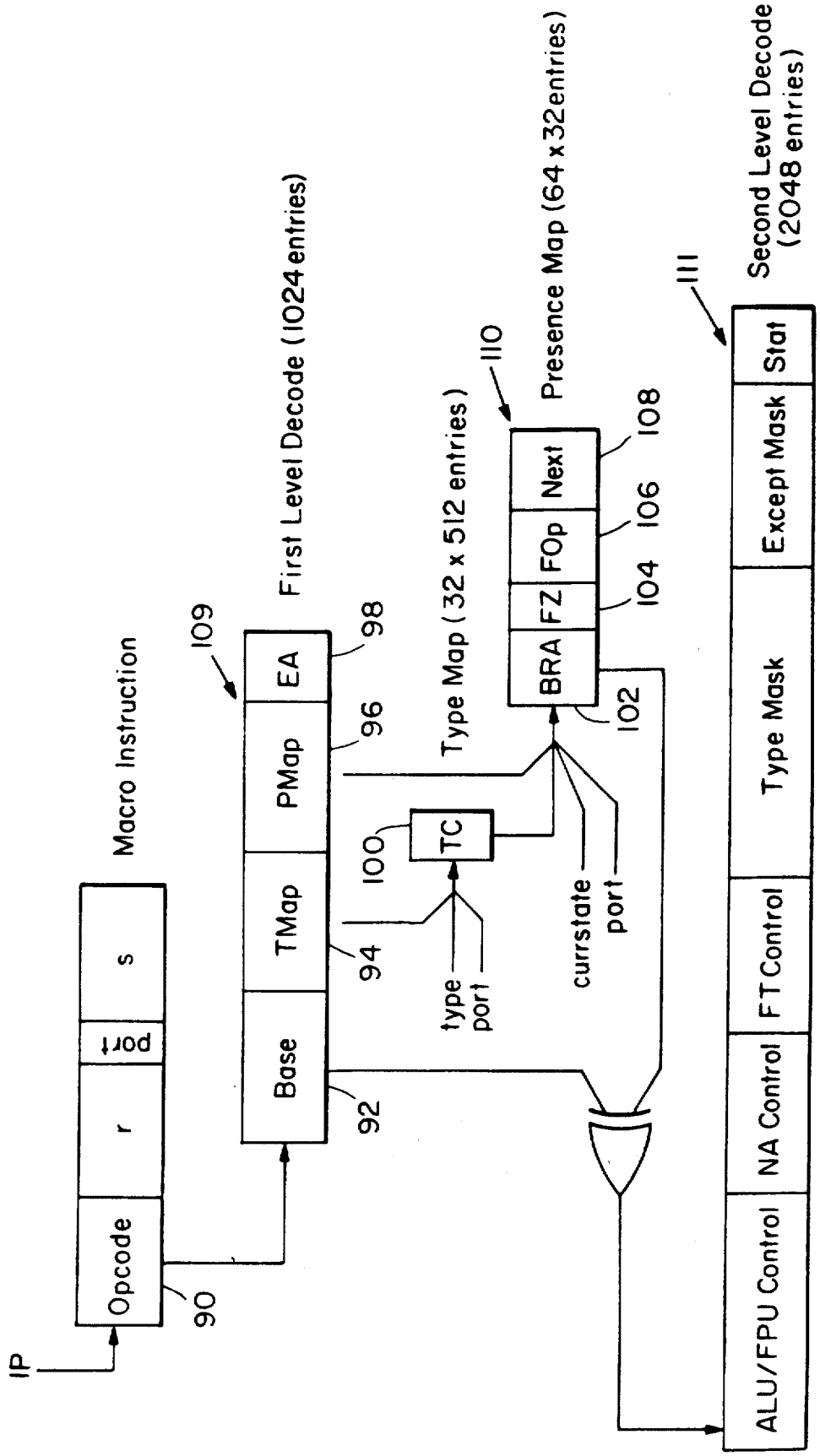
FIG. 15 shows the decoding strategy.

During the first substage (See "First Level Decode" FIG. 15), the 10 bit OPCODE 90 field is used as an address to a first level decode table. Entries 109 in the first level decode table have four fields. A BASE field 92 specifies the base address for an entry in the second level decode. The TMAP field 94, on the other hand, specifies one of 32 type maps. In addition, the PMAP field 96 specifies one of 64 presence maps and lastly, the EA field 98 specifies the effective address generation mode.

The OPCODE 90 is used to look up a first level decode table entry 109, and the EA field 98 of the entry is examined. It is 2 bits long. If both bits are zero, the address equals FP+r; if both bits are one, the address equals r; and if the leading bit is one and the trailing bit is a zero, the address equals IP+r.

During this first substage 80 (FIG. 3), the TMAP (94 in FIG. 15) field is also examined. As mentioned above, the TMAP field 94 selects one of 32 type maps. The type maps are two dimensional arrays of size 256 by 2. Each entry has 2 bits. These 2 bits represent a mapping from the port and the data type of the value of the token in the first substage. To conclude the substage, the token, effective address and type code are passed on to the next substage 82 (FIG. 3).

The second substage 82 is the presence bits substage. In this substage 82 the system looks at the memory location specified by the particular address. From the location it reads the 2 presence bits. It uses these bits along with the port of the token in the substage, the type code bits 100 that were read from the type map and the PMAP field 96 of first level code entry to look up an entry 110 in the presence map table. The presence map table has sixty-four entries and each entry has four fields. The BRA field 102 is for four-way branch control and will be discussed below. The FZ field 104 determines whether the force-to-zero override is exerted. It, likewise, will be discussed more below. The FOP field 106 specifies which operand fetch/store operation is to be performed (i.e., read, write, exchange, or exchange-decrement). The final field 108 specifies the new value of the presence bits. It is denoted as NEXT.

In the third and final substage 84, the fetch/store operation specified by the FOP field is carried out. The contents of the location specified by the effective address are passed on to the next stage of the pipeline. Furthermore, the BRA field 102 of the presence map and the BASE field 92 of the first level decode entry are ORed to produce an address in a second level decode. The second level decode table entry is used to specify parameters used in system operation. If the FZ field 104 is one, the BASE field 92 is forced to zero before being ORed. The net result is the second level decode table entry 111 is set as an absolute address of 0, 1, 2 or 3.

The above-described system relieves the programmer of the herculean task of instilling parallelism into the data processing system. Since parallelism is inherent in the instruction set and implemented via hardware, this system is much easier to use than present parallel processing machines. The matching mechanism has been simplified so as to remove the inbred complexity found in associative memory systems. The unique memory design is primarily responsible for the diminished overhead.

In addition, the fine-grained nature of the present system provides a number of benefits. First, it exposes the maximum amount of parallelism. Second, it can readily tolerate memory latency because it can process other tokens while a memory access request is being serviced. Third, it is easier to compile than coarse-grained systems. In sum, the present invention optimizes performance, simplicity and cost effectiveness.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. In a data processing system, a method of executing an arithmetic/logical instruction comprising the steps, performed by the system, of
   a) fetching an arithmetic/logical instruction;
   b) accessing a memory location indicated by the arithmetic/logical instruction wherein the memory location is comprised of a value field for storing a value and a state field for indicating the current state of the memory location;
   c) operating on the state field as determined by the arithmetic/logical instruction and current state of the memory location;
   d) operating on the value field as determined by the arithmetic/logical instruction and current state of the memory location;
   e) performing or not performing the arithmetic/logical instruction as determined by the current state of the memory location and the arithmetic/logical instruction.

2. A method as recited in claim 1 wherein the data processing system is a parallel multiple processor system.

3. A method as recite din claim 1 wherein the operating on the value field step comprises performing an operation selected from the write operation, the read operation, the exchange operation or the non-operative operation.

4. In a data processing system, a method, performed by the system, of matching operands of a single instruction, comprising the steps of:
   a) locating a first available operand of the instruction, checking a memory location for presence of another available operand and storing the first available operand of the instruction in the memory location where another operand is not present;
   b) altering a state of the memory location to reflect that an operand of the instruction is stored at the memory location;
   c) locating a second available operand of the instruction;
   d) checking the memory location for presence of the first available operand of the instruction; and
   e) reading the first available operand from the memory location and sending the operands to a processing means to execute the instruction.

5. A method as recited in claim 4 further comprising the step of changing the state of the memory location to indicate that the memory location is empty after the first available operand is read from memory.

6. A method as recited in claim 4 wherein the data processing system is a multiple processor system.

7. A method of processing tokens in a data processing system having a pipeline of processing units, comprising the steps, performed by the pipeline, of:
   a) receiving a token from a token buffer into the pipeline;
   b) by means of a first stage of the pipeline, fetching an instruction from memory of the data processing system to operate on the token;
   c) in a second stage of the pipeline, performing operand matching on the token as indicated by the fetched instruction;
   d) in a third stage of the pipeline, performing an ALU operation specified by the fetched instruction; and
   e) in a fourth stage of the pipeline, forming a new token or tokens from results of the ALU operation and the fetched instruction.

8. A method as recited in claim 7 further comprising the step of passing the new token into the pipeline and if more than one token has been formed, passing the other token to the token buffer.

9. A method as recited in claim 7, the operand matching step further comprising if the instruction specifies a dyadic operation
   examining a state field of a location specified by the token to see if a value is present;
   if a value is present,
     reading the value out of a value field of the location;
     passing the value along with the value field of the token presently in the operand matching stage on to the next stage of the pipeline;
   if a value is not present,
     writing the value of the token into the value field of the location;
     issuing no activity to the next stage; and
     directing the fourth stage of the pipeline to perform no operation.

10. A method as recited in claim 9, the operand matching step further comprising
    if the instruction specifies a monadic operation, passing the token on to the next stage of the pipeline.

11. A method as recited in claim 9 wherein the data processing system is a multiple processor parallel processing system.

12. A method as recited in claim 9 wherein the data processing system is a data flow processing system.

13. A method of handling exceptions in a pipelined data processing system comprising the steps, performed by the system, of:
    a) storing activities in a register as they enter a pipeline;
    b) flagging an activity when an exception occurs;
    c) halting processing of the activity;
    d) freezing the value of the activity in the register so that its value may not be changed or replaced;
    e) replacing the activity with a noninterruptable exception activity that remedies the exception;
    f) processing the exception activity;
    g) continuing the processing of the activity.

14. A data processing system comprising
    a) a memory for storing instructions and for storing activation frames that are working areas in which operands are matched;
    b) a buffer for storing tokens that represent operands as the tokens wait to be processed;
    c) a processing pipeline in communication with the memory and the buffer for processing tokens stored in the buffer, comprising
       an instruction fetch stage for fetching instructions to manipulate the tokens in the pipeline;
       an operand matching stage for matching the operands responsive to the fetched instruction;
       an operation stage for performing operations specified by the fetched instruction; and
       a token formation stage for forming new tokens carrying results of the operations specified by the fetched instruction.

15. A data processing system as recited in claim 14 wherein there are multiple processing elements that operate in parallel.

16. A data processing system as recited in claim 14 wherein the data processing system is a data flow processing system.

17. A data processing system as recited in claim 14 wherein each memory location contains a value field that stores values and a state field that stores the current state of the value field.

18. A data processing system as recited in claim 14 wherein the buffer operates on a Last-In-First-Out (LIFO) basis.

19. A data processing system as recited in claim 18 wherein the buffer comprises a plurality of stacks.

20. A data processing system as recited in claim 18 wherein the plurality of stacks are prioritized such that tokens in a higher priority stack are processed before tokens in a lower priority stack.

21. A data processing system as recited in claim 14 wherein each token comprises a tag for indicating an address for an instruction that acts upon the token as well as an activation frame, and also comprise a value for storing a piece of data.

22. A data processing system as recited in claim 21 wherein the tag comprises a context pointer that points to a beginning of an activation frame, a statement pointer that points to an instruction that acts on the token, and a port indicator that indicates a port for the token.

23. A data processing system as recited in claim 21 wherein computations are performed on tags.

24. A data processing system as recited in claim 22 wherein the instruction fetch stage determines which instruction is fetched by examining the statement pointer of the token.

25. A data processing system as recited in claim 22 wherein each activation frame is identified by a different context pointer value.

26. A data processing system as recited in claim 14 wherein code sections may be shared by more than one processing element.

27. A data processing system as recited in claim 14 wherein a fetched instruction encodes a matching rule for matching operands, a rule for computing an effective address of a storage location on which the matching rule operates, an ALU operation to be performed by an ALU of the data processing system, and a token forming rule for forming new tokens that result from execution of the instruction.

28. A data processing system as recited in claim 27 wherein the operand matching stage of the pipeline relies on the rule for computing an effective address and the matching rule of the instruction as well as the context pointer and statement pointer to match operands.

29. A data processing system as recited in claim 27 wherein a dyadic matching rule tells the system to write in a value of a token into a value field of a location of the effective address if a state field of the location indicates that another value is not present in the value field, and if the state field indicates that another value is present, then, to pass both the token and the value held in the value field of the location are passed on to the operation stage of the pipeline.

30. A data processing system as recited in claim 14 wherein a monadic matching rule merely passes a token on to the operation stage of the pipeline.

31. A data processing system as recited in claim 27 wherein a sticky matching rule tells the system to write a value of a token into a value field of a location of the effective address if a state field of the location indicates that another value is not present, and changes the state field of the location to indicate that a value is present if the value of the token is not a constant and changes the state field of the location to indicate that a constant is present if the value of the token is a constant.

32. A data processing system as recited in claim 31 wherein the sticky matching rule tells the system to exchange the value of the token with the value field of the location if the state field of the location indicates that a non-constant value is present.

33. A data processing system recited in claim 31 wherein the sticky matching rule tells the system to read the value field of the location if the state field of the location indicates that the value in the value field is a constant.

34. A data processing system as recited in claim 27 wherein the operation stage of the pipeline determines what operation an ALU of the operation stage performs by looking to the instruction.

35. A data processing system as recited in claim 34 wherein the operation stage of the pipeline performs an operation on matched tokens and passes values from the operation stage of the pipeline to the token formation stage of the pipeline.

36. A data processing system as recited in claim 27 wherein the token formation stage of the pipeline forms new tokens from results of the operation stage of the pipeline.

37. A data processing system as recited in claim 36 wherein the token formation stage comprises a set of multiplexers whose inputs are results from the operation stage and which select amongst the results based on the fetched instruction.

38. A data processing system as recited in claim 37 wherein two new tokens can be formed at a time in the token formation stage of the pipeline.

39. A data processing system as recited in claim 14 wherein if two tokens that exit the pipeline, one is returned to the pipeline.

40. A data processing system as recited in claim 14 wherein as a new token exits the pipeline it feeds directly back into the pipeline, and if there is a second new token, as it exits the pipeline it feeds into the buffer.

41. A data processing system as recited in claim 14 wherein an activity is a tuple with a context/statement element and two value elements derived from value fields of matched tokens.

42. A data processing system as recited in claim 41 wherein the context/statement element comprises a context pointer and a statement pointer pointing to an instruction which operates on tokens in the pipeline.

43. A data processing system as recited in claim 41 wherein as tokens enter the pipeline, an activity associated with them is stored in a register so that if an exception occurs, a value in the register storing the activity associated with the exception remains unchanged until the exception is handled, and new tokens are substituted by an exception handling token for resolving the exception.

44. A data processing system as recited in claim 43 wherein the data processing system is a data flow processing system.

45. A data processing system as recited in claim 44 wherein the data processing system is a tagged token processing system.

46. A data processing system as recited in claim 45 wherein processing of the exception handling token may not be interrupted.

47. A data processing system as recited in claim 14 wherein each processing element is associated with regions of storage of the activation frames.

48. A data processing system as recited in claim 47 wherein a subset of bits in a context pointer indicate which processing element is associated with a region of the activation frames.

49. A data processing system as recited in claim 47 wherein the buffer for storing tokens is a single port memory.

50. A data processing system as recited in claim 25 wherein tokens generated in different iterations of a loop have different contexts.

51. A data processing system as recited in claim 24 wherein the instruction fetched is used to address an entry in a first level decode table.

52. A data processing system as recited in claim 51 wherein the entry in the first level decode table specifies an effective address generation mode, a type map, a presence map and a base address for an entry into a second level decode table.

53. A data processing system as recited in claim 52 wherein the type map part of the entry along with type information and part information from the value part of the token are used to address a location in the type map.

54. A data processing system as recited in claim 53 wherein the contents of the addressed location in the type map, the port part of the token and a current present state of a location pointed to by the effective address are used to locate an entry in a presence map.

55. A data processing system as recited in claim 54 wherein the entry in the presence map indicates a new state for the location pointed to by the effective address, one of a set of branch locations in a second level decode table, a frame store operation, and a force-to-zero override.

56. A data processing system as recited in claim 55 wherein the frame store operation is either a read, write, or exchange operation.

57. A data processing system as recited in claim 55 wherein the one of the set of branch locations in the second level decode table is logically ORed bits of the base address held in the first level decode table to produce an address in the second level decode table.

58. A data processing system as recited in claim 57 wherein if the force-to-zero override is asserted the base field from the first level decode is force-to-zero before being ORed with one of the set of locations producing an address corresponding to an absolute second level decode entry.

59. A tagged token data flow machine comprising:
a processor pipeline which processes tokens and produces new tokens,
a buffer for storing tokens to be processed in the processor pipeline,
a plurality of registers for recording activities associated with the tokens in each stage of the pipeline such that, if an exception occurs, an activity that caused the exception is available, ad
an exception handler for resolving exceptions that occur in the pipeline by examining the plurality of registers to find an activity for each exception that occurs.

60. A tagged token data flow machine as recited in claim 59 wherein when an exception occurs, the register corresponding to the token involved in the exception is frozen so that its value does not change, no new tokens are produced, and the exception handler is activated.

61. A tagged token data flow machine as recited in claim 60 wherein when activated, the exception handler produces an exception token that is non-interruptable and which is fed into the pipeline to remedy the exception.

62. A tagged token data flow machine comprising:
a plurality of memory locations each having a value field and a state field and
a programmed processor for responding to tokens to store data values in the memory locations and operate on the data values, the programmed processor comprising:
means for reading a state field of a memory location; and
means for processing a sticky matching rule by writing a value of a token into a value field of a memory location if a state field of the location indicates that another value is not present and by changing the state field of the location, the state field being changed to indicate that a replaceable value is present if the value of the token is not a constant and to indicate that a retained constant is present if the value of the token is a constant.

63. A tagged token data flow machine as recited in claim 62 wherein the programmed processor reads the value field of the memory location without writing a new value if the state field indicates that a value in the value field is a constant.

64. In a data flow processing system a method, performed by the system, comprising:
providing tokens, each token comprising a frame pointer, an instruction pointer and a value, the instruction pointer pointing to an instruction which processes the values of tokens with identical frame pointers and identical instruction pointers;
responsive to a token, addressing a storage location in memory identified by the instruction pointer within an activation frame identified by the frame pointer; and
determining whether a value is stored in the addressed storage location, and
if a value is stored, performing the operation determined by the instruction pointer on the stored value and the value of the token to create a new token, and
if the value is not stored, storing the value of the token in the storage location.

65. A method as claimed in claim 64 wherein the step of addressing comprises fetching an instruction to which the instruction pointer points, the instruction identifying an offset from a memory location to which the frame pointer points.

66. A method as claimed in claim 64 wherein the step of determining whether a value is stored comprises checking a flag in the addressed storage location.

67. A data processing system comprising at least one data processor and memory, the memory having instructions and data storage therein, the at least one data processor, operating on the instructions, comprising:
means for generating tokens, each token identifying a frame pointer, which points to an activation frame of memory locations for values on which a block of instructions; and
means responsive to an instruction pointer of a token to determine whether at least one operand is stored in the activation frame to which the frame pointer points and for initiating an operation on operands once all operands for the operation are available in the activation frame.

68. A system as claimed in claim 67 wherein a token includes a value to be stored in an activation frame to which the frame pointer of the token points, the at least one data processor comprising means responsive to the instruction pointer to store the value in the activation frame.

69. A system as claimed in claim 68 wherein a memory location in an activation frame comprises a state field for indicating a current state of the memory location and a value field for storing an operand on which the data processor operates with the value from a token.

70. A system as claimed in claim 69 wherein the state field indicates a data type of the value in the value field.

71. A system as claimed in claim 69 wherein the state field indicates whether a value is stored in the value field.

72. A system as claimed in claim 69 wherein the system is a multiple processor parallel processing system.

73. A system as claimed in claim 72 wherein a processor which operates on an activation frame is identified by the frame pointer.

74. In a data processing system comprising at least one data processor and memory, the memory having instructions and data stored therein, a method, performed by the system, comprising:
generating tokens, each token identifying a frame pointer, which points to an activation frame of memory locations on which a block of instructions operates, and an instruction pointer;
responsive to an instruction pointer of a token, determining whether an operand is stored in the activation frame to which the frame pointer points; and
initiating an operation determined by the instruction pointer on the operands once all operands for the operation relative to the activation frame are available.

75. A method as claimed in claim 74 wherein a token includes a value to be stored in an activation frame to which a frame pointer of the token points, and the processor responds to the instruction pointer to store the value in the activation frame.

76. A method as claimed in claim 75 wherein memory location in an activation frame comprises a state field for indicating a current state of the memory location and a value field for storing an operand on which the data processor operates with the value from a token.

77. A method as claimed in claim 76 wherein the state field indicates a data type of the value in the value field.

78. A method as claimed in claim 76 wherein the state field indicates whether a value is stored in the value field.

79. A method as claimed in claim 74 wherein the data processing system is a parallel multiple processor system and the processor which operates on an activation frame is identified by the frame pointer.

* * * * *

UNITED STATES PATENT AND TRADEMARK OFFICE
CERTIFICATE OF CORRECTION

PATENT NO. : 5,241,635

DATED : August 31, 1993

INVENTOR(S) : Gregory M. Papadopoulos, David E. Culler and Arvind

It is certified that error appears in the above-indentified patent and that said Letters Patent is hereby corrected as shown below:

In the specification, column 1, lines 6, 7 and 8, change "The Government has rights in this invention pursuant to contract Number N00014-84-K-0099 awarded by the Department of the Navy" to --This invention was made with government support under Contract No. N00014-84-K-0099 awarded by the Department of the Navy. The government has certain rights in the invention.--

UNITED STATES PATENT AND TRADEMARK OFFICE
CERTIFICATE OF CORRECTION

PATENT NO. : 5,241,635
DATED : August 31, 1993
INVENTOR(S) : Gregory M. Papadopoulos, David E. Culler and Arvind It is certified that error appears in the above-indentified patent and that said Letters Patent is hereby corrected as shown below:

In Claim 3, column 21, line 26, change "recite din" to --recited in--.

In Claim 59, column 25, line 59, change "ad" to --and--.

In Claim 67, column 26, line 64, after "instructions" insert --operates, and an instruction pointer which points to an instruction within the block of instructions--.

In Claim 72, column 27, line 19, change "69" to --67--.

Signed and Sealed this

Nineteenth Day of April, 1994

BRUCE LEHMAN

*Attest:*

*Attesting Officer*       Commissioner of Patents and Trademarks